United States Patent
Mukundala et al.

(10) Patent No.: US 10,446,012 B2
(45) Date of Patent: Oct. 15, 2019

(54) METHOD AND APPARATUS FOR DETECTING WHEN A MOBILE DEVICE IS LEFT IN A ROOM

(71) Applicant: Carrier Corporation, Palm Beach Gardens, FL (US)

(72) Inventors: Sumanth Kumar Mukundala, Telangana (IN); Adam Kuenzi, Silverton, OR (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/128,915

(22) Filed: Sep. 12, 2018

(65) Prior Publication Data

US 2019/0197870 A1 Jun. 27, 2019

(30) Foreign Application Priority Data

Dec. 23, 2017 (IN) .............................. 201711046507

(51) Int. Cl.
G08B 21/24 (2006.01)
H04W 4/02 (2018.01)

(52) U.S. Cl.
CPC .............. G08B 21/24 (2013.01); H04W 4/02 (2013.01)

(58) Field of Classification Search
CPC ...................................................... G08B 21/24
USPC .......................................... 340/539.1–539.19
See application file for complete search history.

(56) References Cited

U.S. PATENT DOCUMENTS

| 7,518,514 B2 | 4/2009 | Bauchot et al. |
| 7,880,613 B1 | 2/2011 | Maeng |
| 8,493,226 B2 | 7/2013 | Tedesco |
| 8,570,168 B2 | 10/2013 | Logan et al. |
| 8,866,607 B2 | 10/2014 | Velusamy |
| 8,947,222 B2 | 2/2015 | Deluca |
| 9,217,754 B2 | 12/2015 | Crucs |
| 9,311,805 B2 | 4/2016 | Zishaan |
| 9,547,783 B2 | 1/2017 | Lewis et al. |
| 2003/0149576 A1 | 8/2003 | Sunyich |
| 2007/0037605 A1 | 2/2007 | Logan |
| 2011/0084807 A1* | 4/2011 | Logan ...................... H04Q 9/00 340/10.1 |
| 2014/0011482 A1 | 1/2014 | Le et al. |
| 2014/0057646 A1 | 2/2014 | Vaananen |

(Continued)

FOREIGN PATENT DOCUMENTS

| CN | 105869363 A | 8/2016 |
| DE | 102012001939 A1 | 8/2012 |

(Continued)

OTHER PUBLICATIONS

Extended European Search Report for Application No. 18215411.2-1206; Report Issued Date May 8, 2019; Report Received Date: Jun. 3, 2019; 55 pages.

*Primary Examiner* — Joseph H Feild
*Assistant Examiner* — Sharmin Akhter
(74) *Attorney, Agent, or Firm* — Cantor Colburn LLP

(57) ABSTRACT

A method of detecting when a mobile device is left in a room is provided. The method comprising: receiving a status of an access control operably connected to a door of a room; collecting positional data of a mobile device; determining a location of the mobile device relative to the room; and activating an alarm in response to the location determined.

24 Claims, 3 Drawing Sheets

(56) References Cited

U.S. PATENT DOCUMENTS

| | | | |
|---|---|---|---|
| 2015/0154847 A1 | 6/2015 | Oliver et al. | |
| 2015/0339912 A1* | 11/2015 | Farrand | G08B 25/001 340/501 |
| 2015/0350405 A1* | 12/2015 | Rettig | H04M 1/72533 455/404.1 |
| 2016/0042581 A1* | 2/2016 | Ku | G07C 9/00309 340/5.61 |
| 2016/0217675 A1* | 7/2016 | Schroeder | G08B 21/24 |
| 2016/0300411 A1* | 10/2016 | Isaacson | G07C 9/00103 |

FOREIGN PATENT DOCUMENTS

| | | |
|---|---|---|
| DE | 102013205198 A1 | 10/2013 |
| WO | 2006136662 A1 | 12/2006 |

\* cited by examiner

METHOD AND APPARATUS FOR DETECTING WHEN A MOBILE DEVICE IS LEFT IN A ROOM

CROSS-REFERENCE TO RELATED APPLICATIONS

This application claims the benefit of Provisional Indian Application No. 201711046507 filed Dec. 23, 2017, which is incorporated herein by reference in its entirety.

BACKGROUND

The subject matter disclosed herein generally relates to the field of access control systems, and more particularly to an apparatus and method for operating access control systems.

Existing access controls may allow a person to unlock hotel rooms via a key card and/or a mobile device. However if a person locks their key card and/or mobile device in their hotel room, they have to walk down to the front desk receptionist for a new key card or to unlock their door.

BRIEF SUMMARY

According to one embodiment, a method of detecting when a mobile device is left in a room is provided. The method comprising: receiving a status of an access control operably connected to a door of a room; collecting positional data of a mobile device; determining a location of the mobile device relative to the room; and activating an alarm in response to the location determined.

In addition to one or more of the features described above, or as an alternative, further embodiments may include that positional data further comprises: a location of the mobile device relative to the door when the status of the access control was generated.

In addition to one or more of the features described above, or as an alternative, further embodiments may include that positional data further comprises: a derivative of a location of the mobile device relative to the door within a selected time period of when the status of the access control was generated.

In addition to one or more of the features described above, or as an alternative, further embodiments may include: activating a microphone on the mobile device for a selected time period after the alarm is activated.

In addition to one or more of the features described above, or as an alternative, further embodiments may include: receiving an audible command on the mobile device within the selected time period; and transmitting an access request to the access control in response to the audible command.

In addition to one or more of the features described above, or as an alternative, further embodiments may include: activating a microphone on a room management system for a selected time period after the alarm is activated.

In addition to one or more of the features described above, or as an alternative, further embodiments may include: receiving an audible command on the room management system within the selected time period; and transmitting an access request to the access control in response to the audible command.

In addition to one or more of the features described above, or as an alternative, further embodiments may include that the alarm is activated on at least one of a room management system, the mobile device, and the access controller.

In addition to one or more of the features described above, or as an alternative, further embodiments may include that the status of the access control is advertised by the access control using wireless signal.

In addition to one or more of the features described above, or as an alternative, further embodiments may include that the wireless signal is Bluetooth.

According to another embodiment, a computer program product tangibly embodied on a computer readable medium is provided. The computer program product including instructions that, when executed by a processor, cause the processor to perform operations comprising: receiving a status of an access control operably connected to a door of a room; collecting positional data of a mobile device; determining a location of the mobile device relative to the room; and activating an alarm in response to the location determined.

In addition to one or more of the features described above, or as an alternative, further embodiments may include that positional data further comprises: a location of the mobile device relative to the door when the status of the access control was generated.

In addition to one or more of the features described above, or as an alternative, further embodiments may include that positional data further comprises: a derivative of a location of the mobile device relative to the door within a selected time period of when the status of the access control was generated.

In addition to one or more of the features described above, or as an alternative, further embodiments may include that the operations further comprise: activating a microphone on the mobile device for a selected time period after the alarm is activated.

In addition to one or more of the features described above, or as an alternative, further embodiments may include that the operations further comprise: receiving an audible command on the mobile device within the selected time period; and transmitting an access request to the access control in response to the audible command.

In addition to one or more of the features described above, or as an alternative, further embodiments may include that the operations further comprise: activating a microphone on a room management system for a selected time period after the alarm is activated.

In addition to one or more of the features described above, or as an alternative, further embodiments may include that the operations further comprise: receiving an audible command on the room management system within the selected time period; and transmitting an access request to the access control in response to the audible command.

In addition to one or more of the features described above, or as an alternative, further embodiments may include that the alarm is activated on at least one of a room management system, the mobile device, and the access controller.

In addition to one or more of the features described above, or as an alternative, further embodiments may include that the status of the access control is advertised by the access control using wireless signal.

In addition to one or more of the features described above, or as an alternative, further embodiments may include that the wireless signal is Bluetooth.

Technical effects of embodiments of the present disclosure include alerting a person assigned to a room when they are leaving the room that they have left their mobile device to unlock the room in the room that they are leaving.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Figure 1:
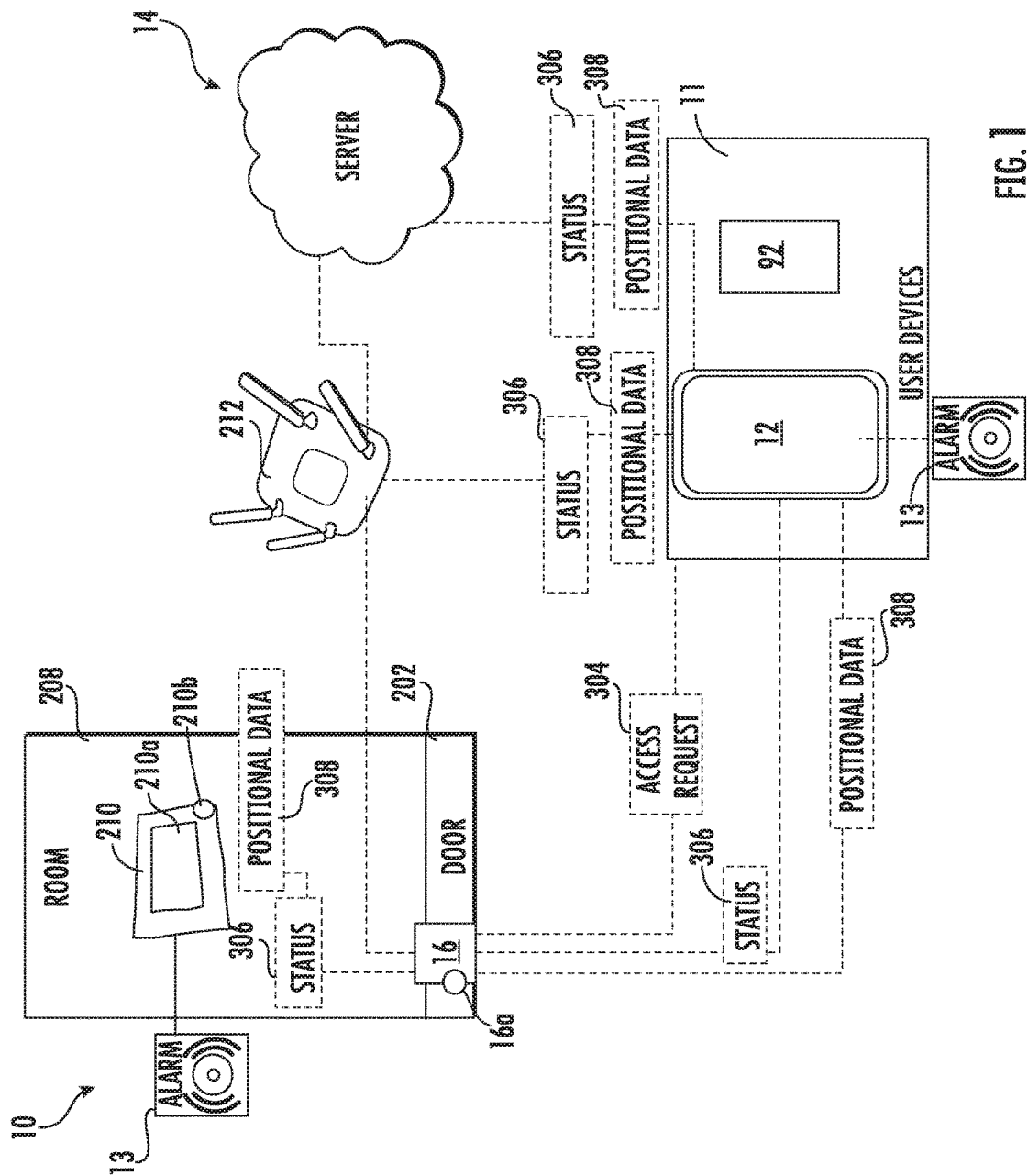
FIG. 1 illustrates a general schematic system diagram of an access control system, in accordance with an embodiment of the disclosure.

FIG. 1 schematically illustrates an access control system 10. The system 10 generally includes a user device 11, a server 14, a wireless access protocol device 212, a room management system 210, and an access control 16. It should be appreciated that while one access control 16 is illustrated, the access control system 10 may include any number of access controls 16. It should be appreciated that, although particular systems are separately defined in the schematic block diagrams, each or any of the systems may be otherwise combined or separated via hardware and/or software. In another embodiment, the access controls 16 may control access through a door 202 to a room 208. It should be appreciated that while one door 202 and room 208 are illustrated, the access control system 10 may include any number of doors 202 and rooms 208. Further, there may be multiple doors 202 and access controls 16 for each room 208. A room management system 210 may be located in each room 208. The room management system 210 is configured to control operations of a room 208 including but not limited to temperature and lighting.

For a selected period of stay (e.g. period of time for a person staying at a hotel) the user device 11 belonging to a person may be granted access to one or more access controls 16 (e.g. the door lock on a hotel room assigned to the person). When a person checks into the hotel room their user device 11 will be granted access to a room 208. There may be one or more user devices 11 assigned to a room 208 (e.g. a husband and a wife), thus embodiments disclosed herein may apply to multiple user devices 11 per room 208. A person may utilize their user device 11 to unlock and/or lock the access control 16 operably connected to their assigned room 208 through an access request 304. The user device may store credentials to unlock and/or lock the access control 16. Some credentials may be used for multiple access controls 16 if there are multiple access controls 16 for a single assigned room 208 or the person is assigned access to multiple rooms 208. For example, an access control 16 operably connected to a person's hotel room and an access control 16 operably connected to a hotel pool may respond to the same credential. Other credentials may be specific to a single access control 16.

The user device 11 may be a physical key card 92 and/or a mobile device 12. The user device 11 may transmit an access request 304 to the access control 16 by short-range radio transmission when the user device 11 is placed proximate the access control 16 or by the user device being inserted into the access control 16 for the access control to read the user device (e.g. a magnetic strip on an encoded card 92). The physical key card 92 is capable of being encoded with card data, such as, for example, a magnetic strip or RFID chip. The card data may include credentials to grant access to a specific access control 16. For example, for a period of stay for the user device 11 may be granted access to a specific access control 16. The mobile device 12 is a wireless capable handheld device such as a smartphone that is operable to communicate with the server 14 and the access controls 16. The server 14 may provide credentials and other data to the access control 16, such as firmware or software updates to be communicated to one or more of the access controls 16. Although the server 14 is depicted herein as a single device, it should be appreciated that the server 14 may alternatively be embodied as a multiplicity of systems, from which the mobile device 12 receives credentials and other data.

Each access control 16 may be a wireless-capable, restricted-access, or restricted-use device such as wireless locks, access control readers for building entry, and other restricted-use machines. The user device 11 submits credentials to the access controls 16, thereby selectively permitting a user to access or activate functions of the access controls 16. A user may, for example, submit a credential to an electromechanical lock to unlock it, and thereby gain access to a room 208.

The access control 16 is configured to advertise a status 306 of the access control 16. For example, the status 306 of the access control 16 may indicate whether the access control 16 is locked or unlocked, when the door 202 is opening or closing and/or when a handle (not shown) on the door 202 is being turned to open or close the door 202. The status 306 is advertised to the mobile device 12 via a wireless signal, such as, for example Bluetooth. The mobile device 12 is configured to receive the status 306 and check positional data 308 of the mobile device 12 in response to the status 306, for example if the status 306 shows that the door 202 has opened then the mobile device 12 will check positional data 308 to see if the mobile device 12 is in motion. Positional data 308 of the mobile device 12 may include a location of the mobile device 12. The location of the mobile device 12 may be relative to the access control 16. The positional data 308 may also include a derivative of the location of the mobile device 12 that is indicative of movement by the mobile device 12. Movement may also be detected by a Microelectromechanical system (MEMS) 57, as described below. Positional data 308 may be determined as described below.

In a non-limiting embodiment, the mobile device 12 may be configured to determine that the mobile device 12 is being left in the room 208 as a person exits the room 208 in response to the status 306 and the positional data 308. If the mobile device 12 determines that the mobile device 12 is being left in the room 208 as a person exits the room 208 in response to the status 306 and the positional data 308, then the mobile device 12 may activate an alarm 13 to capture the attention of the person leaving the room 208. The alarm 13 may be audible, vibratory, and/or visual. For example, if a person leaves their mobile device 12 on the hotel room bed as they walk out the door 202, the mobile device 12 may start flashing and the mobile device 12 may produce an audible sound (e.g. beep) as the door 202 is being closed. In another example, if a person leaves their mobile device 12 on the hotel room bed as they walk out the door 202, a smart wearable (e.g. smart watch) being worn by the person and wirelessly connected to the mobile device 12 may start flashing, vibrating, and/or the smart wearable may produce an audible sound (e.g. beep) as the door 202 is being closed. The room management system 210 may be notified by the mobile device 12 that the mobile device 12 was left in the room 208 and then an alarm 13 may be activated on the room management system 210 when the mobile device 12 is left in the room 208. For example, a display screen 210a of the room management system 210 may start flashing and/or the room management system 210 may produce an audible sound (e.g. beep) as the door 202 is being closed. The room management system 210 and/or the mobile device 12 may notify the access control 16 that the mobile device 12 was left in the room 208 and then an alarm 13 may also be activated on the access control 16. For example, a light 16a of the access control 16 may start flashing and/or the access control 16 may produce an audible sound (e.g. beep) as the door 202 is being closed. The room management system 210 may also include a microphone 210b configured to receive audible commands from a person in the room 208.

In a non-limiting embodiment, the room management system 210 may be configured to determine that the mobile device 12 is being left in the room 208 as a person exits the room 208 in response to the status 306 and the positional data 308, then room management system 210 may activate an alarm 13 to capture the attention of the person leaving the room 208. In another non-limiting embodiment, the access control 16 may be configured to determine that the mobile device 12 is being left in the room 208 as a person exits the room 208 in response to the status 306 and the positional data 308, then the access control 16 may activate an alarm 13 to capture the attention of the person leaving the room 208.

The access control 16 may be wirelessly connected to the wireless access protocol device 212 and communicate wirelessly to the mobile device 12. In a non-limiting embodiment, even if the access control 16 is wirelessly capable, communication between the mobile device 12 and the access control may occur through the server 14. For example, the access control 16 may communication wirelessly through the wireless access protocol device 212 to the server 14 and then the server 14 may relay the communication wirelessly to the mobile device 12. In a further example, the mobile device 12 may communicate wirelessly to the server 14 and the server 14 may communicate wirelessly through the wireless access protocol device 212 to the access control 16. The communication between the server 14 and the mobile device 12 may occur through the wireless access protocol device 212 or another wireless network such as, for example, a cellular network. The access control 16 may be hardwired to the server 14 and thus communication between the mobile device 12 and the access control 16 may occur through the server 14. If the access control 16 is not hardwire connected to the server 14 or wirelessly connected to the server 14, the communication may occur between the access control 16 and the mobile device 12 via short range wireless communication, such as for example Wi-Fi, Bluetooth, zigbee, infrared, or any other short-range wireless communication method known to one of skill in the art. In an embodiment, the short-range wireless communication is Bluetooth. The mobile device 12 may have to be within a selected range of the access control 16 in order to utilize short-range wireless communication. The access control 16 may also be wired and/or wirelessly connect to the room management system 210. The access control 16 may be wirelessly connected to the room management system 210 through Wi-Fi, Bluetooth, zigbee, infrared or any other wireless connection known to one of skill in the art.

Figure 2:
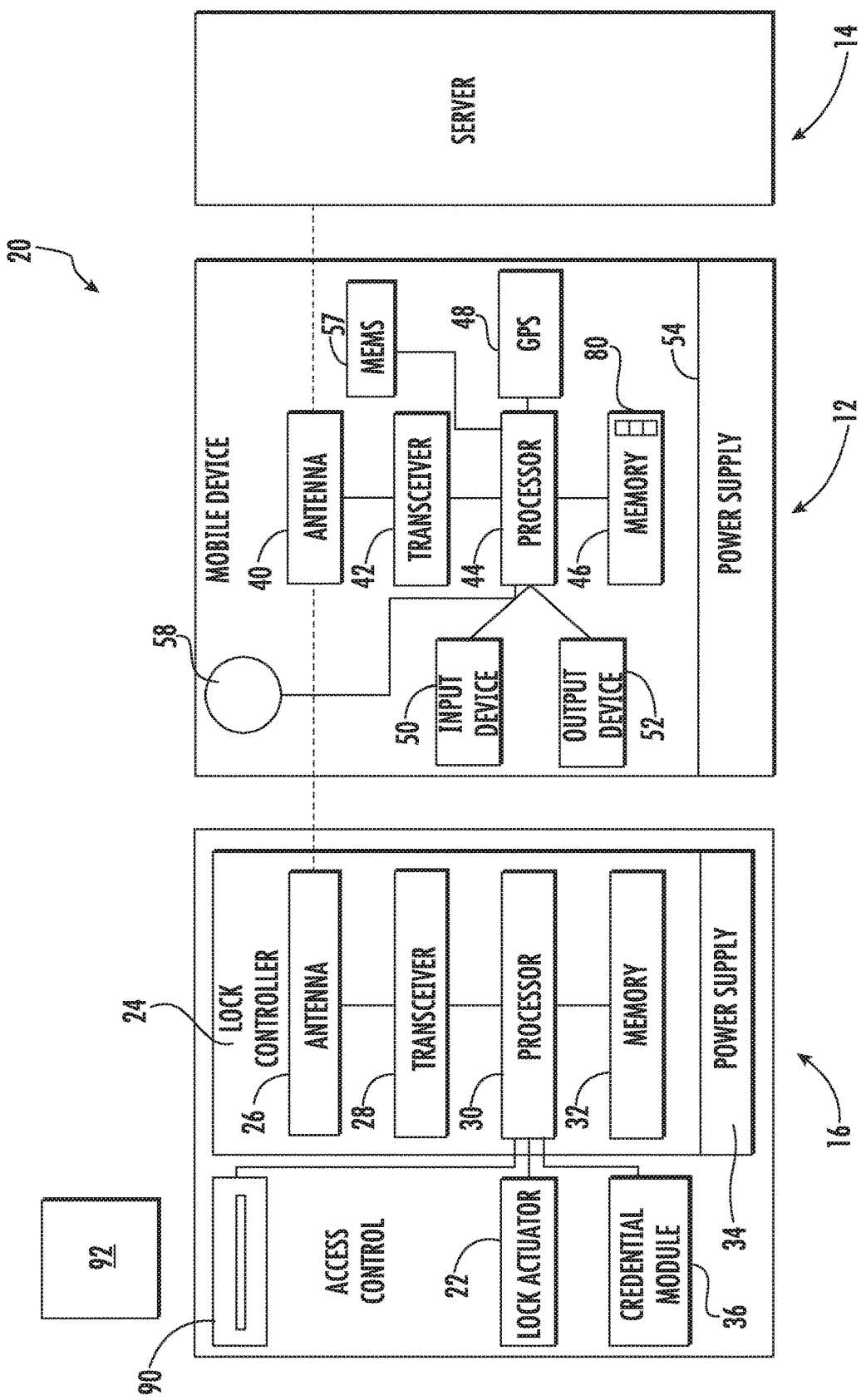
FIG. 2 illustrates a block diagram of an access control, mobile device and server of the access control system of FIG. 1, in accordance with an embodiment of the disclosure.

Referring now to FIG. 2 with continued reference to FIG. 1. FIG. 2 shows a block diagram of an example electronic lock system 20 includes the access control 16, the mobile device 12, and the server 14. The access control 16 generally includes a lock actuator 22, a lock controller 24, a lock antenna 26, a lock transceiver 28, a lock processor 30, a lock memory 32, a lock power supply 34, a lock card reader 90 and a credential module 36. The access control 16 may have essentially two readers, one reader 90 to read a physical key card 92 and the credential module 36 to communicate with the mobile device 12 via the lock processor 30 and the transceiver 28 and antenna 26. The access control 16 is responsive to credentials from the mobile device 12, and may, for example, be the lock of a turnstile or a door lock. Although the present disclosure focuses primarily on credentials for access control, it should be appreciated that other systems wherein credentials are transmitted from a mobile device to an access control so as to identify the user to an online system or validate user access rights or permissions in an offline system will benefit herefrom. Such systems include hotel door lock systems. Upon receiving and authenticating an appropriate credential from the mobile device 12 using the credential module 36, or after receiving card data from lock card reader 90, the lock controller 24 commands the lock actuator 22 to lock or unlock a mechanical or electronic lock. The lock controller 24 and the lock actuator 22 may be parts of a single electronic or electromechanical lock unit, or may be components sold or installed separately.

The lock transceiver 28 is capable of transmitting and receiving data to and from at least the mobile device 12. The lock transceiver 28 may, for instance, be a near field communication (NFC), Bluetooth, infrared, zigbee, or Wi-Fi transceiver, or another appropriate wireless transceiver. The lock antenna 26 is any antenna appropriate to the lock transceiver 28. The lock processor 30 and lock memory 32 are, respectively, data processing, and storage devices. The lock processor 30 may, for instance, be a microprocessor that can process instructions to validate credentials and determine the access rights contained in the credentials or to pass messages from a transceiver to a credential module 36 and to receive a response indication back from the credential module 36. The lock memory 32 may be RAM, EEPROM, or other storage medium where the lock processor 30 can read and write data including but not limited to lock configuration options. The lock power supply 34 is a power source such as line power connection, a power scavenging system, or a battery that powers the lock controller 24. In other embodiments, the lock power supply 34 may only power the lock controller 24, with the lock actuator 22 powered primarily or entirely by another source, such as user work (e.g. turning a bolt).

While FIG. 2 shows the lock antenna 26 and the transceiver 28 connected to the processor 30, this is not to limit other embodiments that may have additional antenna 26 and transceiver 28 connected to the credential module 36 directly. The credential module 36 may contain a transceiver 28 and antenna 26 as part of the credential module. Or the credential module 36 may have a transceiver 28 and antenna 26 separately from the processor 30 which also has a separate transceiver 28 and antenna 26 of the same type or different. In some embodiments, the processor 30 may route communication received via transceiver 28 to the credential module 36. In other embodiments the credential module may communicate directly to the mobile device 12 through the transceiver 28.

The mobile device 12 generally includes a key antenna 40, a key transceiver 42, a key processor 44, a key memory 46, a GPS receiver 48, an input device 50, an output device 52, a key power supply 54, and a Microelectromechanical system (MEMS) 57. The key transceiver 42 is a transceiver of a type corresponding to the lock transceiver 28, and the key antenna 40 is a corresponding antenna. In some embodiments, the key transceiver 42 and the key antenna 40 may also be used to communicate with the server 14. In other embodiments, one or more separate transceivers and antennas may be included to communicate with server 14. The key memory 46 is of a type to store a plurality of credentials locally on the mobile device 12. The mobile device 12 may also include a mobile device application 80. Embodiments disclosed herein, may operate through the mobile device application 80 installed on the mobile device 12. The mobile device 12 may also include a microphone 58 configured to receive audible commands from a person. The MEMS sensor 57 may be a sensor such as, for example, an accelerometer, a gyroscope, or a similar sensor known to one of skill in the art.

The positional data 308 may be detected using one or more methods and apparatus. The positional data 308 may be determined by the mobile device 12 and/or the server 14. The positional data 308 may be communicated to the RMS system 210, access control 16, or other device. The positional data 308 may include a location of the mobile device 12 and/or a movement of mobile device 12 that is a derivative of a location of the mobile device, such as, for example, velocity, acceleration, jerk, jounce, snap . . . etc. The mobile device 12 can determine by the GPS 48, by the MEMS 57, or by triangulating signals from the wireless access protocol device(s) 212 or signals from the access control(s) 16. The mobile device 12 may do calculations based on the received signal strength. The positional data 308 may be crude (i.e. close to access control or far away) or it may be very accurate (i.e. very precise) depending on the method used. The mobile device 12 may then initiate an alarm 13 by sending a message to the server 14, the wireless access protocol device 212, the room management system 210, or the access control 16 which could then activate alarms 13. The server 14 can determine by receiving signals from the wireless access protocol device(s) 212 of signals sent from the mobile device (i.e. a Bluetooth beacon or something). The server then could do the alarm, it could send a message to the mobile device 12, the wireless access protocol device 212, the room management system 210, or the access control 16, which could then activate alarms 13.

The location of the mobile device 12 may also be detected through triangulation of wireless signals emitted from the mobile device 12 or signal strength between the mobile device 12 and the wireless access protocol device 212. The location of the mobile device 12 may be detected using any other desired and known location detection/position reference means.

Figure 3:
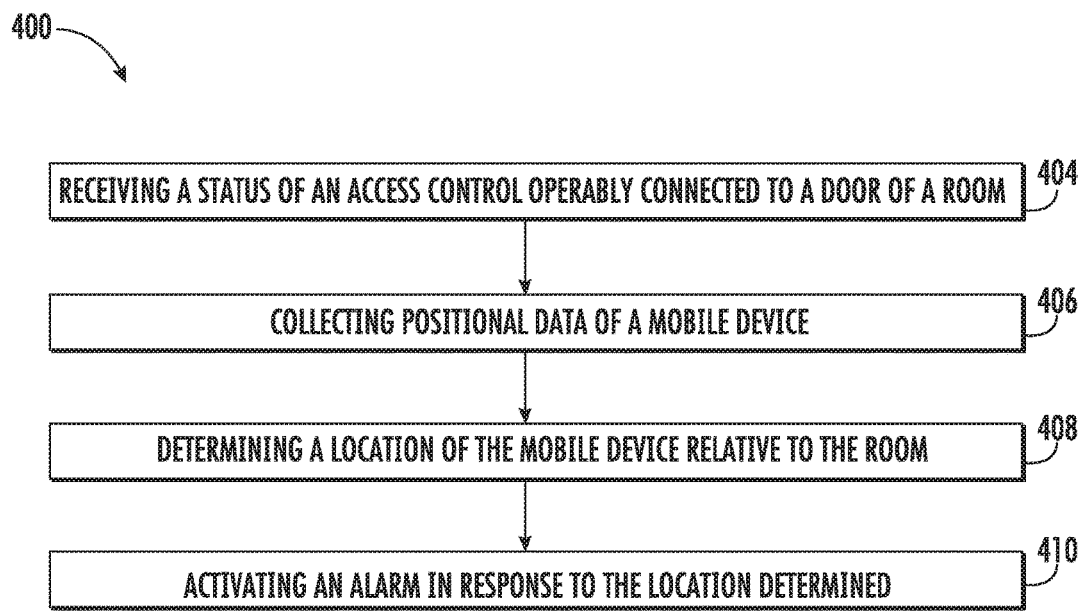
FIG. 3 is a flow diagram illustrating a method of detecting when a mobile device is left in a room, according to an embodiment of the present disclosure.

Referring now to FIG. 3 with continued reference to FIGS. 1-2. FIG. 3 shows a flow chart of method 400 of detecting when a mobile device 12 is left in a room 208, in accordance with an embodiment of the disclosure. The method 400 may be performed by the mobile device 12 and/or the server 14. At block 404, a status 306 of an access control 16 operably connected to a door 202 of a room 208 is received by the mobile device 12 and/or the server 14. At block 406, positional data 308 of a mobile device 12 is collected by the mobile device 12 and/or the server 14, as described above. The positional data 308 may include a location of the mobile device 12 relative to the door 202 when the status of the access control 16 was generated. For example, the positional data 308 may show that the mobile device 12 is located on the hotel bed when the door 202 was opened (i.e. when the status 306 of the access control was generated). The positional data 308 may include a derivative of a location of the mobile device 12 relative to the door 202 within a selected time period of when the status 306 of the access control was generated. For example, the positional data 308 may show that the mobile device 12 was moving towards the door 202 when the door 202 was opened (i.e. when the status 306 of the access control was generated).

At block 408, a location of the mobile device 12 relative to the room 208 is determined by the mobile device 12 and/or the server 14. The location of the mobile device 12 may be crude (e.g. mobile device 12 located in room 208 or mobile device 12 not located in room 208). For example, it may be determined that a person carrying the mobile device 12 is leaving room 208 or the person is leaving the room 208 but not carrying the mobile device 12 because no acceleration data in the positional data 308 is being detected from the mobile device 12 and/or the mobile device 12 is still located in the room. At block 410, an alarm 13 is activated in response to the location determined. For example, an alarm 13 is activated when it is determined that a person is leaving the room 208 without the mobile device 12. The alarm 13 is intended to alert the person that they forgot their mobile device 12. If the mobile device 12 has been left behind, it then activates an alarm 13, communicates to the room management system 210 to activate an alarm 13, or communicates to the server 14 to indicate that the mobile device 12 was left behind so the server 14 could send a notification or alarm 13. The server 14 may activate an alarm 13 by sending a notification to the room management system 210 or the mobile device 12.

The method 400 may include that a microphone 58 on the mobile device 12 may be activated for a selected time period after the alarm 13 is activated in block 410. This selected period of time allows the a person to produce an audible command, which will command the mobile device 12 to transmit an access request 304 to open the access control 16. The audible command may be a verbal command spoken by the person and a percussion command knocked on the door 202 by the person. The mobile device 12 may be pre-programmed or configured to recognize the person's voice and/or the percussion command. The mobile device 12 may be pre-programmed to recognize a series or sequence of knocking on the door 202. For example the intensity or time between knocks could determine a sequence that may be pre-programmed into the mobile device 12 so that when the 'secret' sequence is performed during the time period the mobile device 12 detects this via the microphone 58 and then opens the door 202 with access request 304. The mobile device 12 may be pre-programmed or configured to recognize the person's voice. The recognizing may include an authorizing aspect where a biometric signature of the person's voice is validated to ensure it is the correct person that is proving the voice command. Alternatively the recognizing may not be biometrically linked to the person's voice, but rather the recognizing may be the mobile device 12 processing the audio signal to determine that the command is indicative of a desire to open the door 202. For example the mobile device may distinguish between a voice communicating to someone in a hallway such as "Hello how are you" from a command such as "Open Door".

For example, if a person gets located outside of their room 208 they have the ability to shout through the door 202 to their mobile device 12 in the room 208 in order for the mobile device 12 to open the door 202.

The method 400 may include that a microphone 210c on the room management system 210 may be activated for a selected time period after the alarm 13 is activated in block 410. This selected period of time allows the a person to produce an audible command, which will command the room management system 210 to transmit an access request 304 to open the access control 16. The audible command may be a verbal command spoken by the person and a percussion command knocked on the door 202 by the person. The room management system 210 may be pre-programmed or configured to recognize the person's voice and/or the audible command. For example, if a person gets located outside of their room 208 they have the ability to shout through the door 202 to the room management system 210 in the room 208 in order for the room management system 210 to open the door 202.

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of detecting when a mobile device is left in a room, the
   method comprising:
   receiving a status of an access control operably connected to a door of a room;
   collecting positional data of a mobile device;
   determining a location of the mobile device relative to the room; and
   activating an alarm in response to the location determined;
   activating a microphone on the mobile device for a selected time period after the alarm is activated;
   receiving an audible command on mobile device within the selected time period; and
   transmitting an access request to the access control in response to the audible command.

2. The method of claim 1, wherein positional data further comprises:
   a location of the mobile device relative to the door when the status of the access control was generated.

3. The method of claim 1, wherein positional data further comprises:
   a derivative of a location of the mobile device relative to the door within a selected time period of when the status of the access control was generated.

4. The method of claim 1, wherein:
   the alarm is activated on at least one of a room management system, the mobile device, and the access controller.

5. The method of claim 1, wherein:
   the status of the access control is advertised by the access control using wireless signal.

6. The method of claim 5, wherein:
   the wireless signal is Bluetooth.

7. A computer program product tangibly embodied on a non-transitory computer readable medium, the computer program product including instructions that, when executed by a processor, cause the processor to perform operations comprising:
   receiving a status of an access control operably connected to a door of a room;
   collecting positional data of a mobile device;
   determining a location of the mobile device relative to the room;
   activating an alarm in response to the location determined;
   activating a microphone on the mobile device for a selected time period after the alarm is activated;
   receiving an audible command on mobile device within the selected time period; and
   transmitting an access request to the access control in response to the audible command.

8. The computer program product of claim 7, wherein positional data further comprises:
   a location of the mobile device relative to the door when the status of the access control was generated.

9. The computer program product of claim 7, wherein positional data
   further comprises:
   a derivative of a location of the mobile device relative to the door within a selected time period of when the status of the access control was generated.

10. The computer program product of claim 7, wherein:
    the alarm is activated on at least one of a room management system, the mobile device, and the access controller.

11. The computer program product of claim 7, wherein:
    the status of the access control is advertised by the access control using wireless signal.

12. The computer program product of claim 11, wherein:
    the wireless signal is Bluetooth.

13. A method of detecting when a mobile device is left in a room, the
    method comprising:
    receiving a status of an access control operably connected to a door of a room;
    collecting positional data of a mobile device;
    determining a location of the mobile device relative to the room; and
    activating an alarm in response to the location determined;
    activating a microphone on a room management system for a selected time period after the alarm is activated;
    receiving an audible command on the room management system within the selected time period; and
    transmitting an access request to the access control in response to the audible command.

14. The method of claim 13, wherein positional data further comprises:
    a location of the mobile device relative to the door when the status of the access control was generated.

15. The method of claim 13, wherein positional data further comprises:
    a derivative of a location of the mobile device relative to the door within a selected time period of when the status of the access control was generated.

16. The method of claim 13, wherein:
    the alarm is activated on at least one of a room management system, the mobile device, and the access controller.

17. The method of claim 13, wherein:
    the status of the access control is advertised by the access control using wireless signal.

18. The method of claim 17, wherein:
    the wireless signal is Bluetooth.

19. A computer program product tangibly embodied on a non-transitory computer readable medium, the computer program product including instructions that, when executed by a processor, cause the processor to perform operations comprising:
    receiving a status of an access control operably connected to a door of a room;
    collecting positional data of a mobile device;
    determining a location of the mobile device relative to the room;
    activating an alarm in response to the location determined;
    activating a microphone on a room management system for a selected time period after the alarm is activated;
    receiving an audible command on the room management system within the selected time period; and
    transmitting an access request to the access control in response to the audible command.

20. The computer program product of claim 19, wherein positional data further comprises:
    a location of the mobile device relative to the door when the status of the access control was generated.

21. The computer program product of claim 19, wherein positional data
    further comprises:
    a derivative of a location of the mobile device relative to the door within a selected time period of when the status of the access control was generated.

22. The computer program product of claim 19, wherein:
    the alarm is activated on at least one of a room management system, the mobile device, and the access controller.

23. The computer program product of claim 19, wherein:
    the status of the access control is advertised by the access control using wireless signal.

24. The computer program product of claim 23, wherein:
    the wireless signal is Bluetooth.

* * * * *